(12) United States Patent
Vandal

(10) Patent No.: US 7,140,204 B2
(45) Date of Patent: Nov. 28, 2006

(54) APPARATUS AND METHOD FOR BENDING GLASS USING MICROWAVES

(75) Inventor: Robert A. Vandal, Syracuse, IN (US)

(73) Assignee: Guardian Industries Corp., Auburn Hills, MI (US)

(*) Notice: Subject to any disclaimer, the term of this patent is extended or adjusted under 35 U.S.C. 154(b) by 485 days.

(21) Appl. No.: 10/184,052

(22) Filed: Jun. 28, 2002

(65) Prior Publication Data

US 2004/0000168 A1    Jan. 1, 2004

(51) Int. Cl.
   *C03B 23/023* (2006.01)
(52) U.S. Cl. ............... 65/60.2; 65/106; 65/107
(58) Field of Classification Search ............ 65/107, 65/106, 60.2
   See application file for complete search history.

(56) References Cited

U.S. PATENT DOCUMENTS

| | | | |
|---|---|---|---|
| 3,682,528 A | | 8/1972 | Apfel et al. |
| 4,465,736 A | * | 8/1984 | Nishihara et al. ........... 428/332 |
| 4,474,831 A | | 10/1984 | Downey |
| 4,547,650 A | | 10/1985 | Arditty et al. |
| 4,828,598 A | | 5/1989 | Imamura et al. |
| 4,882,852 A | | 11/1989 | Kautto |
| 4,898,790 A | | 2/1990 | Finley |
| 5,149,351 A | * | 9/1992 | Yaba et al. ................. 65/60.2 |
| 5,383,990 A | | 1/1995 | Tsuji |
| 5,443,669 A | | 8/1995 | Tünker |
| 5,514,476 A | | 5/1996 | Hartig et al. |
| 5,557,462 A | | 9/1996 | Hartig et al. |
| 5,563,734 A | | 10/1996 | Wolfe et al. |
| 5,584,902 A | * | 12/1996 | Hartig et al. ............... 65/32.4 |
| 5,656,053 A | * | 8/1997 | Boaz ........................ 65/106 |
| 5,759,220 A | | 6/1998 | Boaz |
| 5,800,933 A | | 9/1998 | Hartig et al. |
| 5,827,345 A | | 10/1998 | Boaz et al. |
| 5,837,108 A | | 11/1998 | Lingle et al. |
| 5,935,702 A | | 8/1999 | Macquart et al. |
| 5,948,538 A | | 9/1999 | Brochot et al. |
| 6,014,872 A | | 1/2000 | Hartig et al. |
| 6,158,247 A | | 12/2000 | Didelot |
| 6,318,125 B1 | | 11/2001 | Diederen et al. |
| 6,408,649 B1 | | 6/2002 | Sklyarevich et al. |
| 6,576,349 B1 | | 6/2003 | Lingle et al. |
| 2002/0059813 A1 | | 5/2002 | Hirotsu et al. |
| 2004/0229074 A1 | * | 11/2004 | Lingle et al. ............... 428/627 |

FOREIGN PATENT DOCUMENTS

| | | |
|---|---|---|
| DE | 299 05 385 | 8/2000 |
| DE | 100 29 522 | 1/2002 |
| FR | 2 606 866 | 5/1988 |
| JP | 63-265844 | 11/1988 |
| WO | WO 99/53237 | 10/1999 |

(Continued)

OTHER PUBLICATIONS

U.S. Appl. No. 10/101,516, filed Mar. 19, 2002 (copy attached).

*Primary Examiner*—Sean Vincent
(74) *Attorney, Agent, or Firm*—Nixon & Vanderhye P.C.

(57) ABSTRACT

An apparatus and method for bending glass substrate(s) are provided. Microwave radiation is used to heat glass substrate(s) for bending. As a result, a coating supported by the substrate(s) is not heated as much during the bending process compared to if only conventional IR radiation was used. Thus, more extreme degrees of glass bending may be achieved, and/or the likelihood of coating damage reduced.

17 Claims, 7 Drawing Sheets

FOREIGN PATENT DOCUMENTS

| WO | WO 00/73062 | 12/2000 |
| WO | WO 01/83387 | 11/2001 |
| WO | WO 02/04375 | 1/2002 |

* cited by examiner

Radiant absorption of clear glass over an extended wavelength range.

US 7,140,204 B2

APPARATUS AND METHOD FOR BENDING GLASS USING MICROWAVES

This invention relates to an apparatus and method for heat bending glass sheets. More particularly, this invention relates to an apparatus and method for bending coated glass sheets by directing microwave radiation (waves) at the glass sheet(s) in order to heat the same.

BACKGROUND AND SUMMARY OF THE INVENTION

Devices and methods for heat bending glass sheets are well known in the art. For example, see U.S. Pat. Nos. 5,383,990; 6,318,125; 6,158,247; and 5,443,669.

FIG. 1 is a schematic diagram illustrating a conventional apparatus and method for heat bending glass sheets in making a laminated product such as a vehicle windshield. Vehicle windshields are typically curved, and thus require first and second curved (as a result of heat bending) glass sheets laminated to one another via a polymer interlayer. First glass substrate 1 has a multi-layer solar control coating 3 thereon (e.g., low-E coating 3 including at least one IR reflecting layer of a material such as Ag); while second glass substrate 5 need not be coated.

Referring to FIG. 1, two flat glass substrates 1, 5 are placed in a bending furnace (e.g., on a bending mold) in an overlapping manner by interposing an optional lubricating powder (not shown) such as sodium hydrogen carbonate, cerite, magnesium oxide, silica, or the like between contacting surfaces of the two glass substrates. The glass substrates 1, 5 are then heated using infrared (IR) emitting heating elements 7 to a processing temperature(s) near a softening point of the glass (e.g., from about 550 to 850 degrees C., more preferably from about 580 to 750 degrees C.) in order to soften the overlapping glass substrates 1, 5. Upon softening, the glass substrates 1, 5 (including any solar control coating 3 thereon) are bent by their deadweight (i.e., sagging) along a shaping surface of a bending mold (not shown) into the desired curved shape appropriate for the vehicle windshield being made. A press bending apparatus (not shown) may optionally be used after the glass is sufficiently softened (the press bending may be conducted as the final step before cooling the glass).

After being heat bent in such a manner, the bent glass substrates 1, 5 (with solar control coating 3 still on substrate 1) are separated from one another and a polymer inclusive interlayer sheet (e.g., PVB) is interposed therebetween. The glass substrates 1, 5 are then laminated to one another via the polymer inclusive interlayer 9 in order to form the resulting vehicle windshield shown in FIG. 2.

Different vehicle windshield models require different shapes. Some shapes require more extensive bending (i.e., tighter/smaller radii of curvature after bending) than others. As windshields requiring extensive/extreme bending are becoming more popular, the need for high performance solar control coatings (e.g., including one or more IR reflecting Ag layers) has also increased. An example high performance solar control coating 3 is disclosed in WO 02/04375 (and thus counterpart U.S. Ser. No. 09/794,224, now U.S. Pat. No. 6,576,349, filed Feb. 28, 2001), both hereby incorporated herein by reference.

Unfortunately, it has been found that when using conventional glass bending techniques, certain solar control coatings cannot on a regular basis withstand the bending process (es) sometimes used without suffering damage, especially when very tight radius of curvature(s) are required for the windshield. For example, when using conventional IR heating techniques to bend glass sheets for a windshield when the aforesaid solar control coating is provided on one of the sheets, the tightest radius of curvature consistently achievable in the windshield without coating damage is about 3,500 mm. However, windshields having a smaller (or more extreme) tightest radius of curvature are sometimes required, and thus cannot be consistently made using IR heating techniques without damaging the aforesaid coating. Set forth below is an explanation as to why certain solar control coatings have a hard time withstanding conventional IR heat bending processes without suffering undesirable damage.

Referring to FIG. 1, conventional glass bending heating elements emit IR radiation 8 in the near, mid and far IR ranges. By this we mean that heating elements 7 emit each of near-IR (700–4,000 nm; or 0.7 to 4.0 µm), mid-IR (4,000–8,000 nm; or 4–8 µm), and far-IR radiation. Much of the IR radiation that reaches the glass to be bent is in the near-IR range, as the peak of this IR radiation is often in the near-IR range. In certain example instances, at least about 50% of the IR radiation that reaches the glass to be bent is in the near-IR range, sometimes 70% or higher.

As shown in FIG. 3, it has been found that typical soda lime silica glass (often used for substrates 1, 5) absorbs much incident IR radiation at wavelengths above about 3–4 µm (microns). FIG. 3 shows that soda lime silica glass is substantially opaque to IR radiation above 3–4 µm, but rather transmissive of IR radiation below 3–4 µm. Unfortunately, this means that a significant amount of IR radiation in the near-IR range (from 0.7 to 3–4 µm) is not absorbed by the glass substrate(s) 1 and/or 5 and as a result passes therethrough and reaches solar control coating 3. As used herein, the phrase "from 0.7 to 3–4 µm" means from 0.7 m to 3 and/or 4 µm.

Unfortunately, certain of this near-IR radiation which is not absorbed by the glass substrate and reaches solar control coating 3, is absorbed by the coating 3 (e.g., by Ag layer(s) of the coating) thereby causing the coating 3 to heat up. This problem (significant heating of the coating) is compounded by: (a) certain solar control coatings 3 have a room temperature absorption peak (e.g., of 20–30% or more) at wavelengths of approximately 1 µm in the near IR range, at which wavelengths the underlying glass is substantially transmissive, and (b) the absorption of many solar control coatings 3 increases with a rise in temperature thereof (e.g., sheet resistance $R_s$ of Ag layer(s) increase along with rises in temperature). In view of (a) and (b) above, it can be seen that the peak absorption of certain solar control coatings 3 at near-IR wavelengths of about 1 µm can increase from the 20–30% range to the 40–60% range or higher when the coating temperature increases from room temperature to 500 degrees C. or higher, thereby enabling the coating to heat up very quickly when exposed to significant amounts of near-IR radiation.

Coating 3 is more susceptible to being damaged when it is unnecessarily heated up during the glass bending process. When coating 3 is damaged, the bent glass substrate 1 with the damaged coating thereon is typically discarded and cannot be commercially used.

This problem (i.e., coating overheating) affects the shapes that can be attained in the bending process. In particular, more extreme glass bending requires more extreme heating (i.e., at higher temperatures and/or for longer times) of the glass to be bent. As mentioned above, when the coating 3 of WO 02/04375 (and thus counterpart U.S. Ser. No. 09/794,224, now U.S. Pat. No. 6,576,349) is provided on one of the glass substrates (1 or 5), the tightest radius of curvature of bent glass consistently achievable using conventional IR radiation to bend without damaging the coating is about 3,500 mm. This is, of course, undesirable if a portion of a windshield is desired to have a tighter (smaller) radius of curvature; i.e., to be more bent.

U.S. Pat. No. 5,827,345 discloses the use of microwave energy during the bending and tempering of glass. However, the '345 patent uses microwave energy solely for its heating speed. Thus, the '345 patent fails to recognize or solve the problem(s) (e.g., coating over-heating and/or need for smaller radii of curvature(s) for bent glass) addressed and solved by the instant invention. In other words, the '345 patent fails to disclose or suggest using microwave radiation to heat coated glass sheet(s) for the purpose of enabling the coated glass sheet(s) to be bent to a more significant degree or smaller tightest radius of curvature.

An object of this invention is to minimize the peak temperature attained (and/or the time at which a peak temperature is attained) by a solar control coating 3 during a process for heat bending a glass substrate that supports the coating.

Another object of this invention is to provide an apparatus and/or method for heat bending glass substrate(s)/sheet(s), the apparatus and/or method being designed to reduce the amount of near-IR radiation that reaches the glass substrate (s) to be bent during the bending process.

Another object of this invention is to provide a method and/or apparatus for heat bending coated glass substrate(s), where the substrate(s) is/are heated using at least microwave radiation. The use of microwave radiation (and/or less IR radiation) to heat the glass enables the solar control coating supported by the glass substrate to reach a lesser temperature and/or a maximum temperature for a lesser time period than if only conventional IR radiation was used for heating.

By reducing the maximum coating temperature and/or the time at which the coating realizes this temperature, certain embodiments of this invention can achieve one or more of the following advantages: (a) the solar control coating is less likely to be damaged during the bending process of an underlying glass substrate, (b) higher degrees of bending (i.e., tighter radii of curvature) of an underlying glass substrate(s) can be achieved without damaging the solar control coating; and/or (c) power consumption of the heater may possibly be reduced in certain instances.

Another object of certain example embodiments of this invention is to use microwave radiation to heat a coated glass substrate(s) during a bending process, in order to enable the coated substrate to be bent so as to have a tightest radius of curvature of no greater than about 3,000 mm, more preferably no greater than about 2,000 mm, and even more preferably no greater than about 1,000 mm without significant coating damage. In certain example instances, the tightest radius of curvature for a windshield may be as low as 200–500 mm.

Another object of this invention is to fulfill one or more of the above-listed objects.

In certain example embodiments of this invention, one or more of the above-listed objects is/are fulfilled by providing a method of making a vehicle windshield, the method comprising: directing microwave radiation toward first and second glass substrates in order to heat the glass substrates for bending, and wherein a coating supported by one of the glass substrates comprises at least one infrared (IR) reflecting layer comprising silver (Ag) sandwiched between at least a pair of dielectric layers; and bending the glass substrates and laminating the substrates together to form a vehicle windshield so that a tightest radius of curvature defined by a major surface of the resulting windshield is no greater than about 3,000 mm.

In other embodiments of this invention, one or more of the above-listed objects is/are fulfilled by providing a method of bending coated glass, the method comprising: directing microwave radiation toward a glass substrate in order to heat the glass substrate for bending, and wherein a coating supported by the glass substrate comprises at least one infrared (IR) reflecting layer comprising silver (Ag) sandwiched between at least a pair of dielectric layers; and bending the glass substrate and the coating thereon so that a tightest radius of curvature defined by a major surface of the resulting bent glass substrate is no greater than about 3,000 mm.

DETAILED DESCRIPTION OF EXAMPLE EMBODIMENTS OF THE INVENTION

Figure 1:
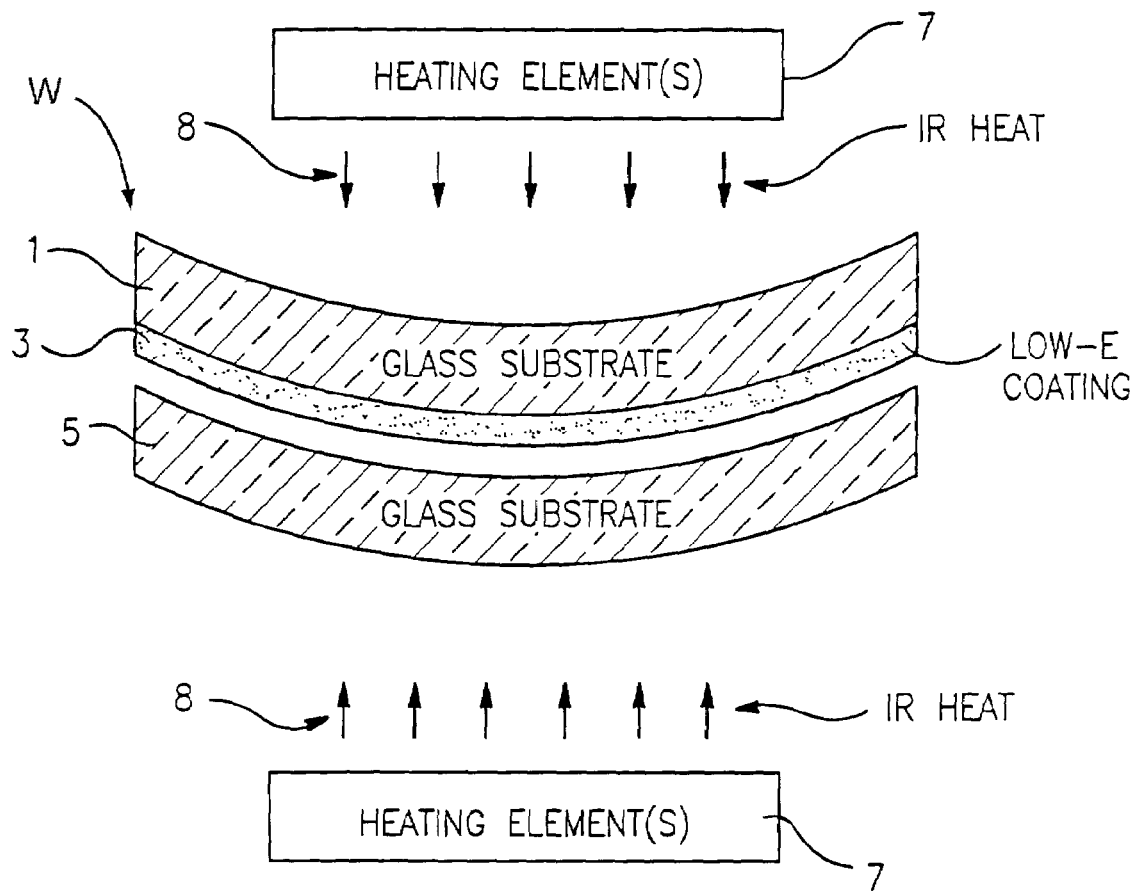
FIG. 1 is a schematic diagram of a conventional apparatus and method for bending glass sheets.

Referring now more particularly to the accompanying drawings in which like reference numerals refer to like parts throughout the several views.

Figure 4:
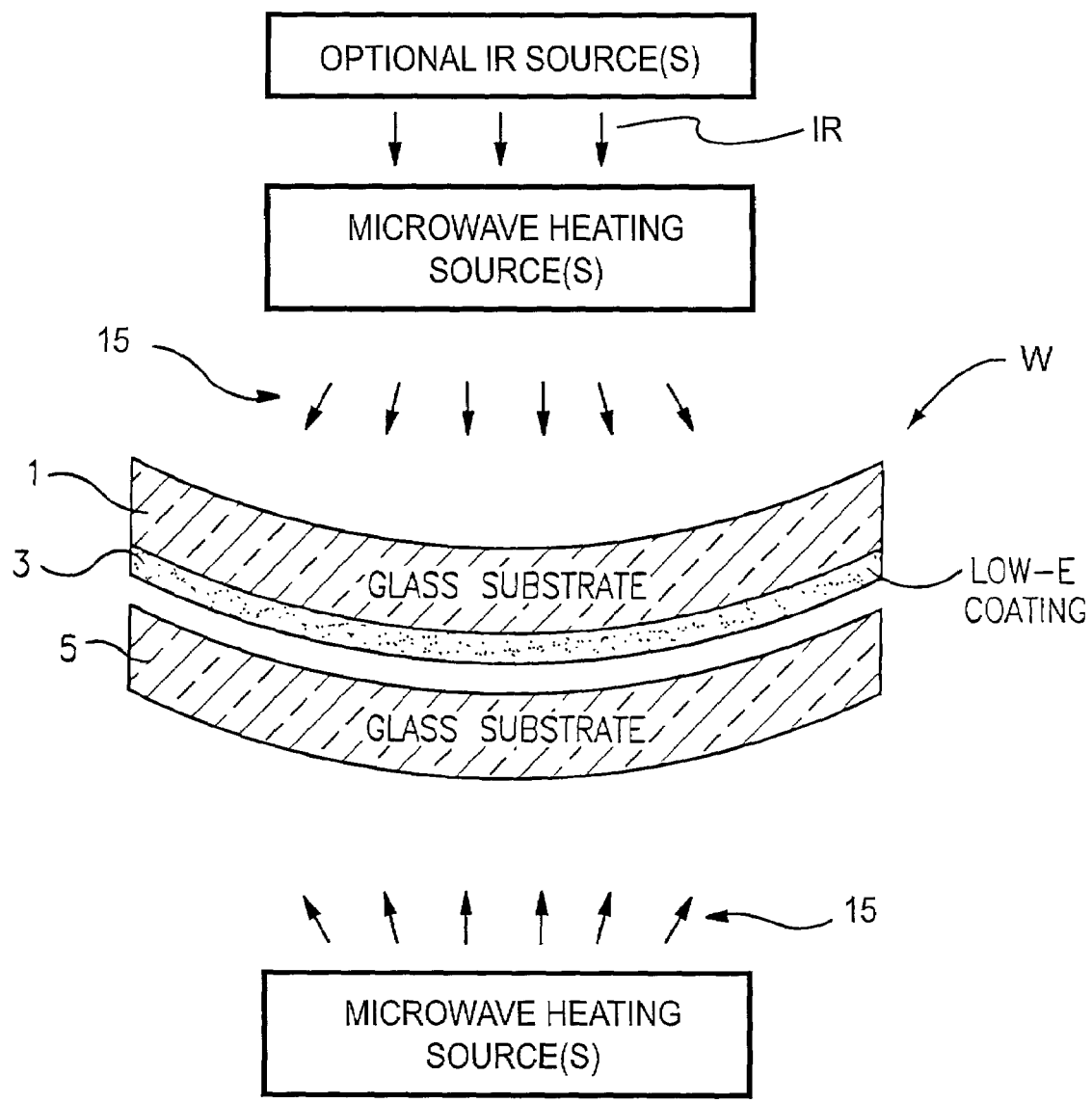
FIG. 4 is a schematic diagram illustrating an apparatus and method for bending glass substrate(s)/sheet(s) according to an example embodiment of this invention.

FIG. 4 is a schematic diagram of an apparatus and method for bending glass substrate(s)/sheet(s) according to an example embodiment of this invention. Glass sheets or substrates bent herein may be used in applications such as vehicle windshields, other types of laminated or monolithic windows, IG window units, or any other suitable application.

According to certain example embodiments of this invention, it has surprisingly been found that the use of at least microwave energy to heat a coated glass substrate to be bent enables the glass substrate to be bent while the maximum temperature achieved/realized (and/or the time period for which a maximum temperature is achieved) by the coating supported by the substrate during the bending process is reduced. By reducing the maximum temperature achieved by the coating during the bending process, the underlying substrate may be bent to a greater extent and/or the likelihood of coating damage may be reduced.

In certain example embodiments of this invention, the microwave radiation/energy used to heat the glass substrate (s) has a wavelength(s) ($\lambda$) of from about 1 to 11 mm, more preferably from about 2 to 10 mm, even more preferably from about 4 to 10 mm, and most preferably from about 6 to 10 mm. It has been found that wavelength(s) within the range of from about 6 to 10 mm work surprisingly well. Moreover, it has been found that when microwave radiation is used to heat a coated glass substrate for the purpose of bending the glass substrate, the coating thereon does not absorb as much of the microwave radiation as compared to conventional IR radiation. As a result, when microwave radiation is used to heat the glass substrate for bending, the coating is not heated as much (as compared to when conventional IR is used to glass bending). Because the coating is not heated as much during the glass bending process, tighter (i.e., smaller) radii of bending curvature for major surface(s) of the glass substrate can be achieved and/or there is less of a chance for coating damage (e.g., Ag agglomeration) during the bending process.

Set forth below is an example of how glass may be bent using microwave radiation according to certain example embodiments of this invention.

Referring to FIG. 4, first and second approximately flat glass substrates 1 and 5 are provided. First glass substrate 1 may have a multi-layer solar control coating 3 thereon (e.g., a low-E coating including at least one IR reflecting layer of a material such as Ag, NiCr, Au or the like). Second glass substrate 5 may or may not be coated in a similar manner. Coating 3 is provided on the side of substrate 1 closest to the other substrate 5 in order to have the coating 3 between lites after lamination. The glass substrates 1, 5 may be of or include soda lime silica glass, or any other suitable type of glass in different embodiments of this invention.

Example solar control coatings 3 are disclosed in U.S. Ser. No. 09/794,224 filed Feb. 28, 2001, now U.S. Pat. No. 6,576,349 (see WO 02/04375), and in U.S. Pat. Nos. 5,229,194; 5,298,048; 5,557,462; 3,682,528; 4,898,790; 5,302,449; 6,045,896; and 5,948,538, all hereby incorporated herein by reference. While these are examples of solar control coatings 3 which may be used, this invention is not so limited as any other suitable solar control coating may instead be used. In certain embodiments of this invention, solar control coating 3 includes at least one IR reflecting layer (e.g. Ag, Au or NiCr) sandwiched between at least first and second dielectric layers (e.g., see FIG. 7). In certain embodiments, the solar control coating 3 includes first and second IR reflecting layers (e.g., of or including Ag, Au or the like), a first dielectric layer (e.g., of or including silicon nitride, silicon oxide, titanium oxide or the like) provided between the underlying glass substrate 1 and the first IR reflecting layer, a second dielectric layer provided between the two IR reflecting layers, and a third dielectric layer provided over both IR reflecting layers (e.g., see WO 02/04375 and Ser. No. 09/794,224, now U.S. Pat. No. 6,576,349) (e.g., see FIG. 7). In certain embodiments of this invention, coating 3 may be deposited onto glass substrate 1 in any suitable manner (e.g., via sputtering as described in any of the aforesaid patents/patent applications).

Referring to FIG. 4 for example, approximately flat glass substrates 1 (with coating 3 thereon) and 5 may be placed in a bending furnace in an overlapping manner by interposing an optional lubricating powder (not shown) such as sodium hydrogen carbonate, cerite, magnesium oxide, silica, or the like between contacting surfaces of the two glass substrates. Coating 3 is between the substrates, and supported by substrate 1 and/or 5. Heating element(s) 7 (e.g., above and/or below the glass substrates 1, 5) emit at least microwave radiation 15 toward the glass substrates 1, 5 in order to heat the same for purposes of bending.

The microwave radiation may or may not be supplemented with other radiation type(s) (e.g., IR) in different embodiments of this invention. For example, IR radiation may be used to pre-heat the glass (one or both substrates 1, 5) up to about 400 to 550 degrees C., and thereafter when the glass becomes a better microwave absorber at these heightened temperatures, the microwave energy is directed at the glass as discussed herein. In this regard, see the optional IR radiation source(s) shown in FIG. 4 that may be used for such glass preheating.

As discussed above, in certain example embodiments the microwave radiation/energy 15 used to heat the glass substrate(s) may be of or include wavelength(s) (X) of from about 1 to 11 mm, more preferably from about 2 to 10 mm, even more preferably from about 4 to 10 mm, and most preferably from about 6 to 10 mm. In certain embodiments of this invention, substantially all radiation used for heating the glass substrate(s) is microwave radiation as described above. However, in alternative embodiments of this invention, at least about 20% (more preferably at least about 40%, even more preferably at least about 60%, and most preferably at least about 75%) of the radiation used for heating the glass substrate(s) to be bent is microwave radiation as described above, with the remainder being made up of other radiation type(s) such as IR radiation.

In certain instances, a single microwave source (i.e., heating element) may be provided, and a beam emitted therefrom is can be split into first and second portions. The first microwave beam portion 15 can be directed at the top substrate, while the second microwave beam portion 15 can be directed at the bottom substrate via mirror(s) or the like. The microwave beam 15 directed toward the substrate(s) may be used to scan the surface of the substrate(s) or flood the surface of the substrate(s) in either case (top and/or bottom). Alternatively, more than one microwave source may be used.

Because of the reduced amount of IR radiation reaching glass substrates and/or coating 3 (due to the use of the microwaves), the coating is not heated as much as it would have been if conventional IR heat had been used for heat bending. Stated another way, by heating the glass substrate(s) using microwave radiation, the coating 3 can be kept at a lower temperature and/or the time period that the coating is at higher temperatures can be reduced. The ability to keep coating 3 at a lower temperature, for example, during bending of the underlying glass substrate 1 enables the coating 3 to be less susceptible to damage. As a result, yields increase and/or more extreme bending may optionally be conducted.

Figure 2:
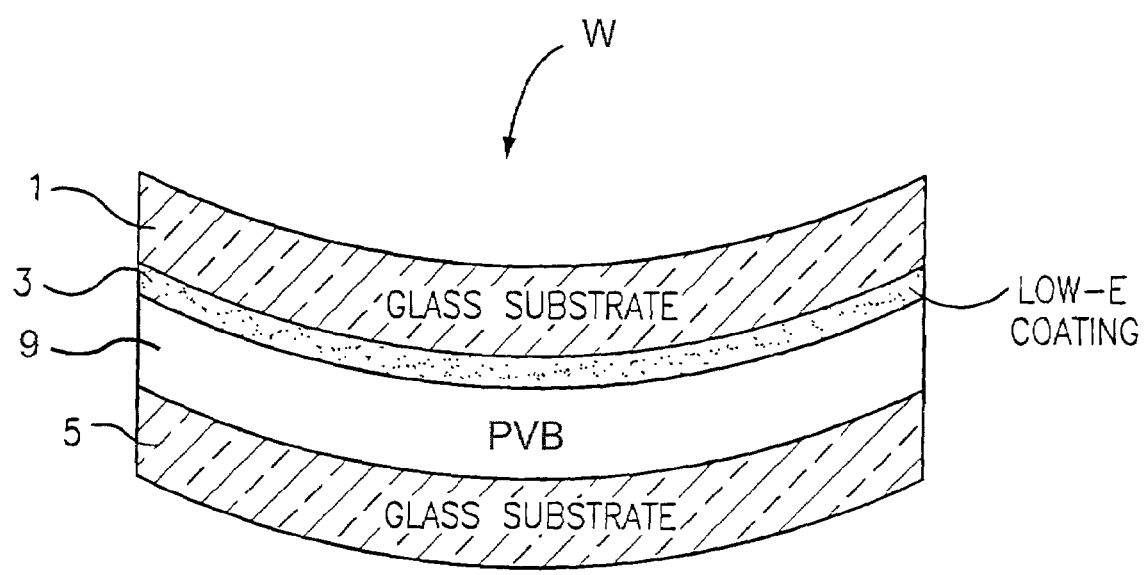
FIG. 2 is a cross sectional view of a vehicle windshield made using the apparatus and method of FIG. 1.
Figure 3:
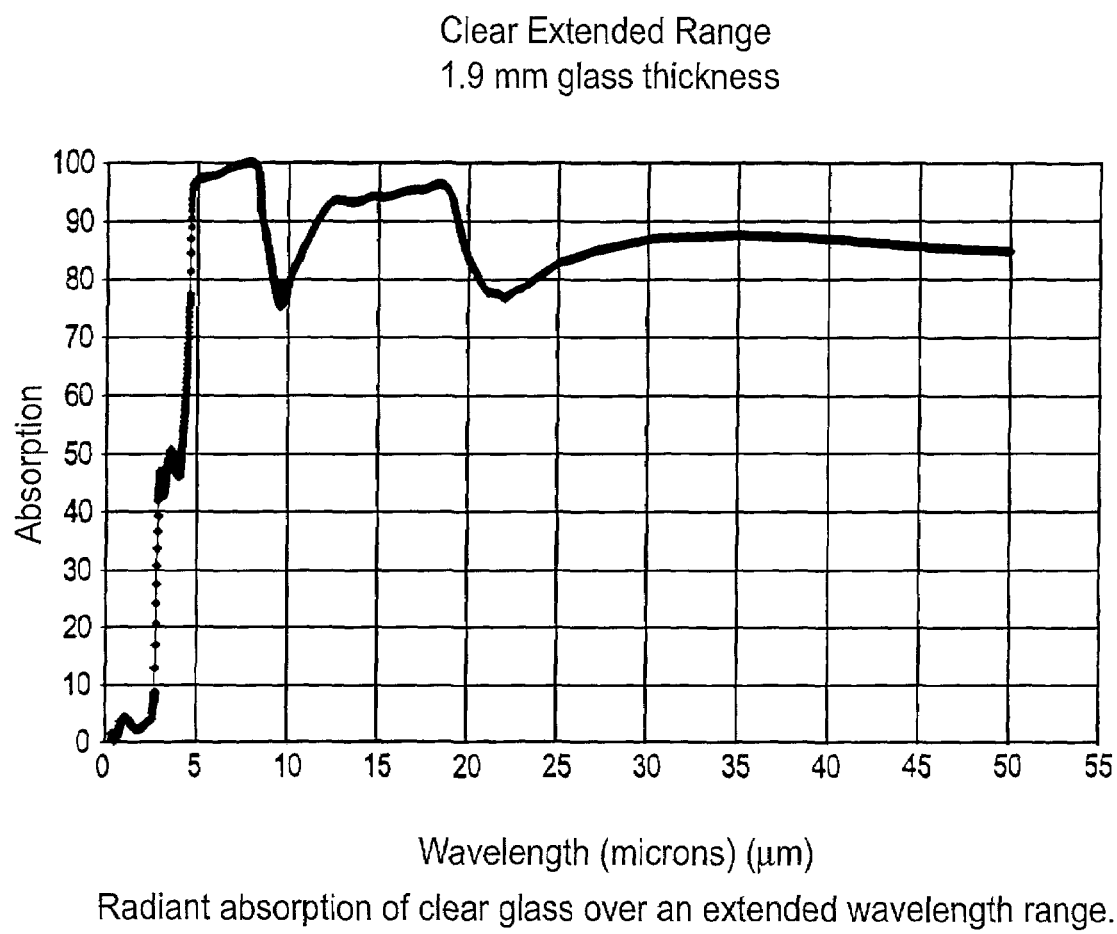
FIG. 3 is a graph (wavelength vs. absorption) illustrating the absorption of IR radiation by a piece of soda lime silica glass as a function of wavelength.

During the bending process, the glass substrates 1, 5 are heated using microwave radiation to a processing temperature(s) near a softening point of the glass (e.g., from about 550 to 850 degrees C., more preferably from about 580 to 750 degrees C.) in order to soften the overlapping glass substrates 1, 5. Upon softening, in certain example embodiments the glass substrates 1, 5 (including any solar control coating 3 thereon) are bent by their deadweight (i.e., sagging) along a shaping surface of a bending mold (not shown) or other suitable structure into the desired curved shape. The glass sheets may optionally be press bent after reaching an appropriate temperature. After being heat bent in such a manner, the bent glass substrates 1, 5 (with solar control coating 3 still on substrate 1) are separated from one another and a polymer inclusive interlayer sheet 9 (e.g., of or including polyvinyl butyral (PVB) or any other suitable laminating material) is interposed therebetween. The bent glass substrates 1, 5 are then laminated to one another via at least the polymer inclusive interlayer 9 in order to form a vehicle windshield W or any other suitable structure (e.g., see FIG. 2).

Figure 6:
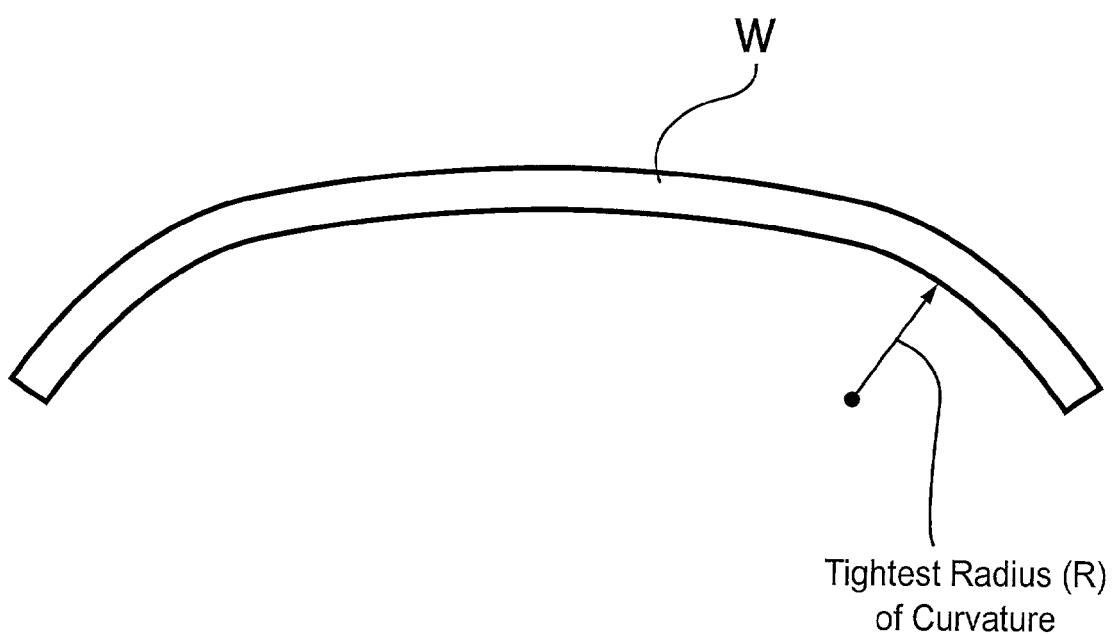
FIG. 6 is a cross sectional view of a vehicle windshield made according to an example embodiment of this invention, wherein a tightest radius of curvature is illustrated for purposes of example only.

In certain example embodiments of this invention, the windshield may be bent to a more extreme degree (i.e., to a tighter or smaller tightest radius of curvature) due to the use of the microwave radiation which allows the coating to absorb less heat during bending. For example, in certain embodiments the resulting windshield W may have a tightest (smallest) radius of curvature of no greater than about 3,000 mm, more preferably no greater than about 2,000 mm, and even more preferably no greater than about 1,000 mm without significant coating damage. In certain example instances, the tightest radius of curvature for the windshield W may be as low as 200–500 mm (e.g., see FIG. 6). Those skilled in the art will of course recognize that these radii of curvature are with respect to a major(s) surface of the windshield W (as opposed to the periphery of the windshield).

The phrase "tightest (or smallest) radius of curvature" means the smallest radius of curvature defined for any portion of a major surface of the bent substrate or windshield. For example, consider a bent windshield that has a curved major surface that defines may different radii of curvature (i.e., the windshield is bent to different degrees at different locations). The tightest radius of curvature is defined at the portion of the bent windshield (or coated substrate) that has the most extreme bend (i.e., sharpest bend).

While FIG. 4 illustrates a pair of glass substrates 1, 5 being bent together at the same time, certain embodiments of this invention are not so limited. In certain alternative embodiments, the bending apparatus may bend only one glass substrate at a time. Moreover, bending techniques and/or methods herein may be used to bend glass substrates 1, 5 regardless of whether they have coatings thereon. The techniques described herein may also be used in order to temper glass substrates (instead of or in addition to bending the glass).

The aforesaid embodiments illustrate first and second heating elements provided on the top and bottom sides, respectively, of glass to be bent. However, this invention is not so limited in all embodiments, as in certain embodiments of this invention only a single heating element need by provided (either above or below the glass to be bent).

Figure 5:
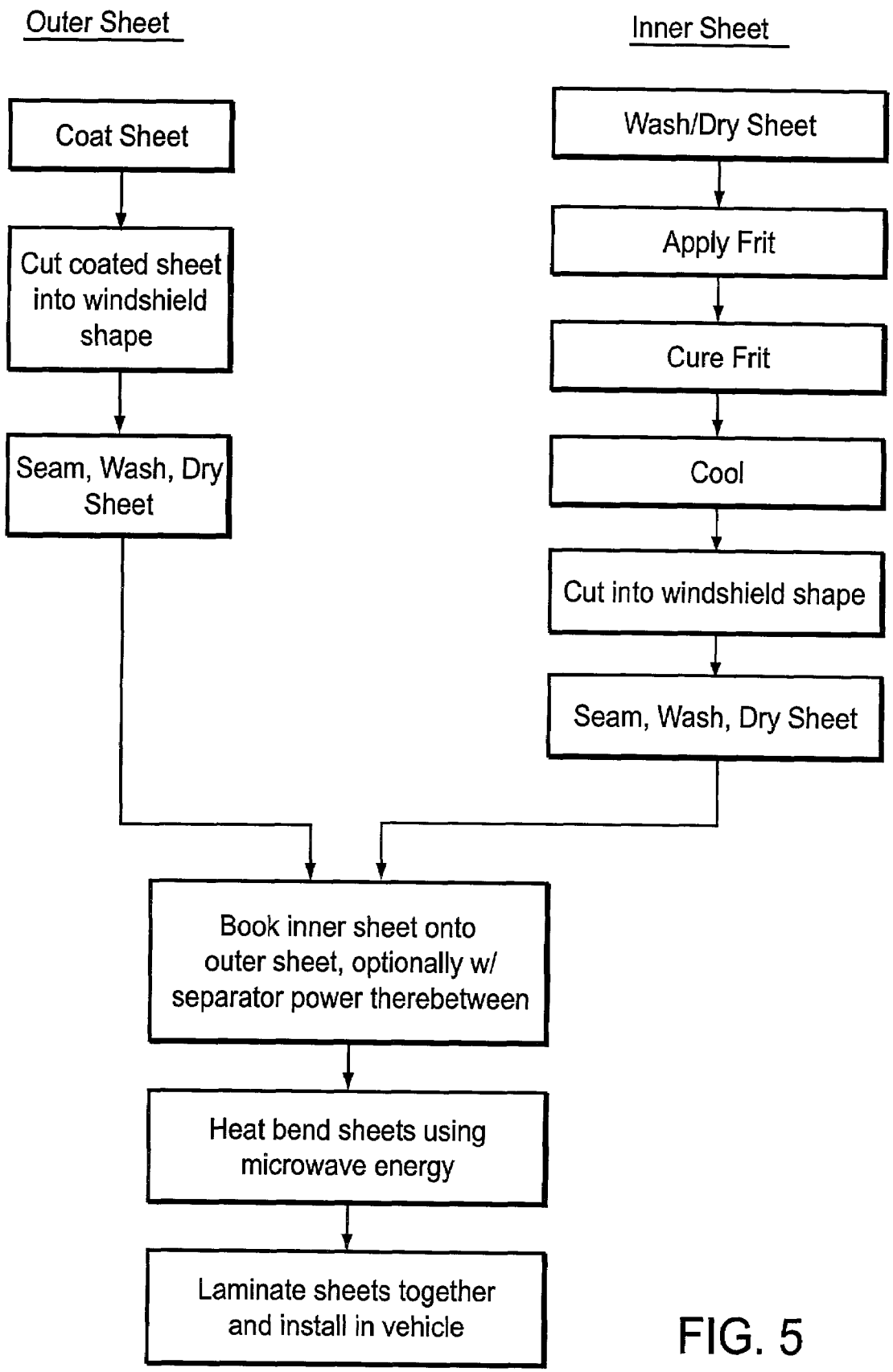
FIG. 5 is a flowchart illustrating certain steps taken in making a vehicle windshield according to an example embodiment of this invention.

FIG. 5 is a flowchart illustrating an example embodiment of this invention where microwave radiation is used in bending a pair of substrates (one coated, the other not coated with a low-E coating) in making a vehicle windshield. In particular, the outer glass sheet 1 has a coating 3 thereon, while the inner glass sheet 5 does not. The outer glass sheet is coated with coating 3, cut into a desired windshield shape, and optionally seamed/washed and/or dried. The inner glass sheet is optionally washed and dried, and then an opaque frit layer may be applied around a peripheral area thereof. The frit layer is cured and cooled. The inner glass sheet is then cut into the desired windshield shape, and optionally seamed, washed and/or dried. The two glass sheets are then booked, optionally with a separator powder therebetween. The booked glass sheets/substrates are then heat bent using microwave energy as discussed above. After being bent together in the same furnace, the bent glass sheets are laminated to one another via at least a polymer inclusive interlayer 9 to form a vehicle windshield.

Figure 7:
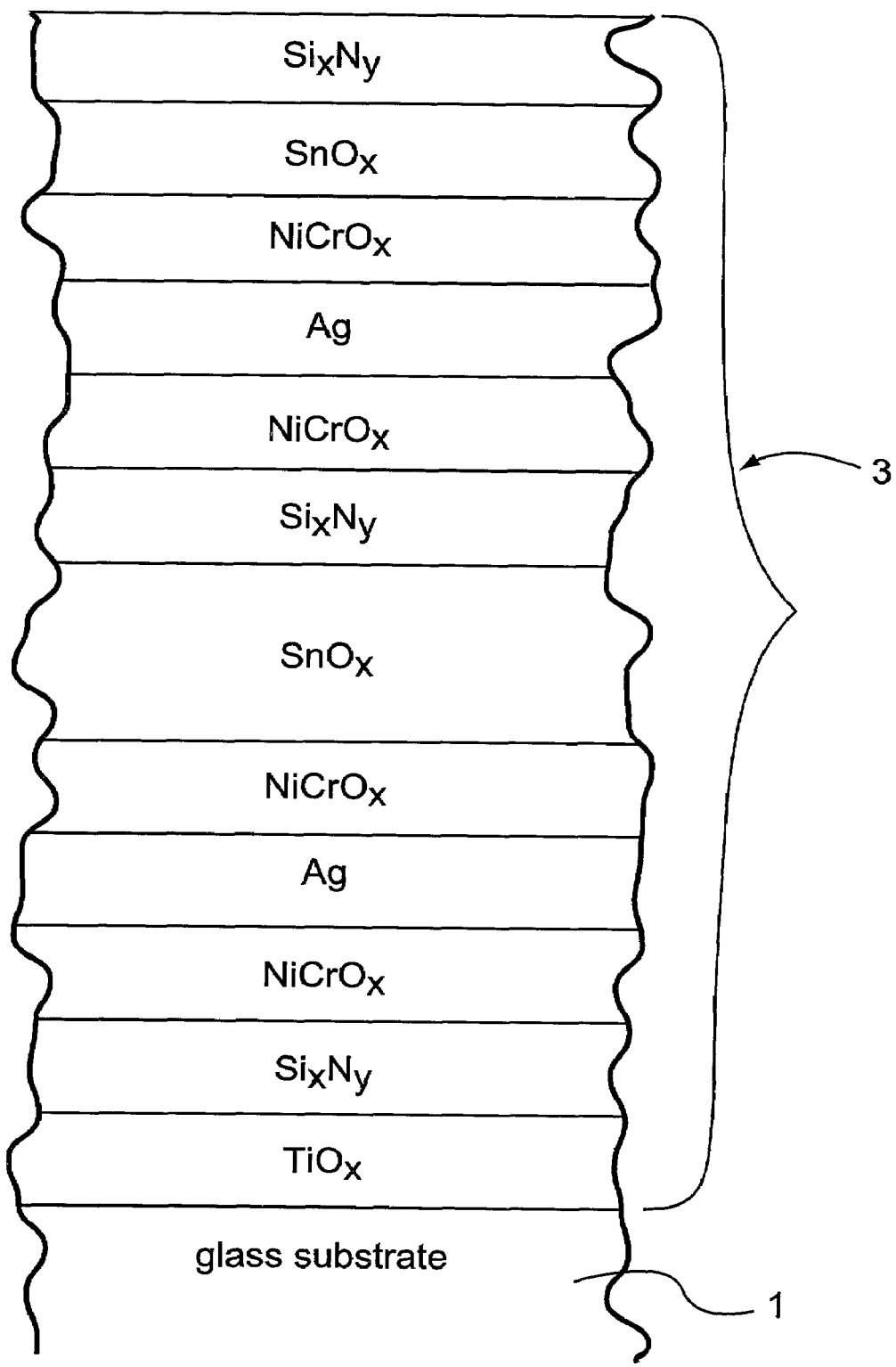
FIG. 7 is a cross sectional view illustrating an example low-E coating according to an embodiment of this invention that may be provided on a glass substrate to be bent.

An example non-limiting low-E coating 3 is shown in FIG. 7. The example coating 3 includes, from the glass substrate 1 outwardly, a dielectric layer (e.g., an oxide of titanium, or any other suitable dielectric), another dielectric layer (a nitride of silicon, or any other suitable dielectric), a first contact layer (e.g., $NiCrO_x$ or any other suitable layer for contacting Ag), a first IR reflecting layer (e.g., Ag or the like), a second contact layer (e.g., $NiCrO_x$ or any other suitable layer for contacting Ag), another dielectric layer (e.g., tin oxide, or any other suitable dielectric), another dielectric layer (e.g., a nitride of silicon, or any other suitable dielectric), a third contact layer (e.g., $NiCrO_x$ or any other suitable layer for contacting Ag), a second IR reflecting layer (e.g., Ag or the like), a fourth contact layer (e.g., $NiCrO_x$ or any other suitable layer for contacting Ag), another dielectric layer (e.g., tin oxide, or any other suitable dielectric), and finally a top dielectric layer (e.g., a nitride of silicon, or any other suitable dielectric). Optionally, certain layers may be added or deleted as desired. In certain alternative embodiments, a protective layer comprising diamond-like carbon (DLC) may be provided over the top of coating 3. As discussed above, other types of coatings may instead be used.

Moreover, it is noted that the coating 3 may be provided on either of the two substrates in different embodiments. Moreover, it would be possible to provide a coating on both substrates in certain instances.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of bending coated glass, the method comprising:

directing microwave radiation toward a glass substrate in order to heat the glass substrate for bending, wherein a coating supported by the glass substrate comprises at least one infrared (IR) reflecting layer comprising silver (Ag) sandwiched between at least a pair of dielectric layers; and bending the glass substrate and the coating thereon so that a tightest radius of curvature defined by a major surface of the resulting bent glass substrate is no greater than about 3,000 mm.

2. The method of claim 1, wherein the glass substrate is bent with the coating thereon so that the tightest radius of curvature defined by the bent glass substrate is no greater than about 2,000 mm.

3. The method of claim 1, wherein the glass substrate is bent with the coating thereon so that the tightest radius of curvature defined by the bent glass substrate is no greater than about 1,000 mm.

4. The method of claim 1, wherein the microwave radiation comprises wavelength(s) within a range of from about 6 to 10 mm.

5. The method of claim 1, wherein the microwave radiation consists essentially of wavelength(s) within a range of from about 6 to 10 mm.

6. A method of making a vehicle windshield, the method comprising:

directing microwave radiation toward first and second glass substrates in order to heat the glass substrates for bending, providing a coating supported by one of the glass substrates which comprises at least one infrared (IR) reflecting layer comprising silver (Ag) sandwiched between at least a pair of dielectric layers; and bending the glass substrates while the coating is supported by one of the substrates to form bent substrates and laminating the bent substrates together to form a vehicle windshield so that a tightest radius of curvature defined by a major surface of the resulting windshield is no greater than about 3,000 mm.

7. The method of claim 6, wherein the glass substrates are bent with the coating thereon so that the tightest radius of curvature defined by the windshield is no greater than about 2,000 mm.

8. The method of claim 6, wherein the glass substrates are bent with the coating thereon so that the tightest radius of curvature defined by the windshield is no greater than about 1,000 mm.

9. The method of claim 6, wherein the microwave radiation comprises wavelength(s) within a range of from about 6 to 10 mm.

10. The method of claim 6, wherein the microwave radiation consists essentially of wavelength(s) within a range of from about 6 to 10 mm.

11. A method of bending coated glass, the method comprising:
directing microwave radiation toward a glass substrate with a solar control coating thereon in order to heat the glass substrate for bending, the solar control coating including at least one IR refiectin glayer; and
bending the glass substrate with the solar control coating thereon so that a smallest radius of curvature defined by a major surface of the resulting bent glass substrate is no greater than about 3,000 mm.

12. A method of making a vehicle windshield, the method comprising:
directing microwave radiation comprising at least one wavelength from 6 to 10 mm toward a glass substrate in order to heat the glass substrate for bending;
providing a coating on the glass substrate to be bent, the coating comprising at least one layer comprising Ag sandwiched between at least two dielectric layers;
after heating the glass substrate using the microwave radiation, causing the glass substrate to be bent and thereafter laminated to another substrate thereby forming a vehicle windshield; and
directing IR radiation toward the glass substrate to be bent in order to pre-heat the glass substrate to a temperature of from about 400 to 550 degrees C, and thereafter using the microwave radiation to further heat the glass substrate for bending.

13. The method of claim 1, further comprising directing IR radiation toward the glass substrate in order to pre-heat the substrate to a temperature of from about 400 to 550 degrees C, and thereafter using the microwave radiation to further heat the glass substrate for bending.

14. A method of making a vehicle windshield, the method comprising:
directing radiation toward first and second glass substrates in order to heat the glass substrates for bending,
providing a coating, supported by one of the glass substrates, which comprises at least one infrared (IR) reflecting layer comprising silver (Ag) sandwiched between at least a pair of dielectric layers; and
bending the glass substrates while the coating is supported by one of the substrates to form bent substrates and laminating the bent substrates together to form a vehicle windshield so that a tightest radius of curvature defined by a major surface of the resulting windshield is no greater than about 3,000 mm.

15. The method of claim 14, wherein the glass substrates are bent with the coating thereon so that the tightest radius of curvature defined by the windshield is no greater than about 2,000 mm.

16. The method of claim 14, wherein the glass substrates are bent with the coating thereon so that the tightest radius of curvature defined by the windshield is no greater than about 1,000 mm.

17. The method of claim 14, wherein the radiation comprises microwave radiation consisting essentially of wavelength(s) within a range of from about 6 to 10 mm.

* * * * *